March 15, 1966  W. J. MILAN-KAMSKI  3,241,132
SIGNAL TRANSLATION APPARATUS
Filed May 2, 1960  4 Sheets-Sheet 1
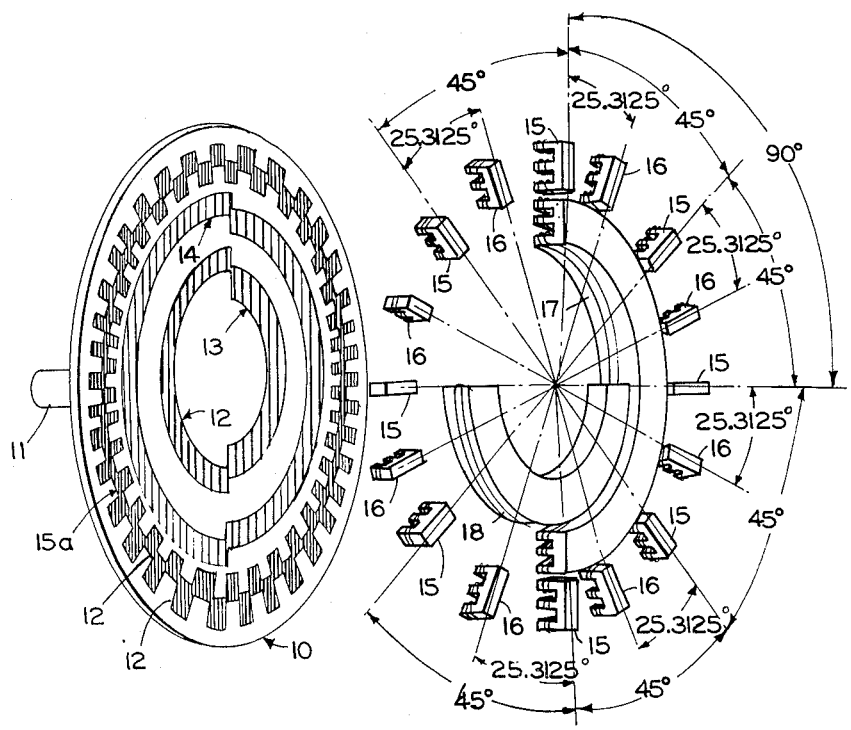
FIG. 1
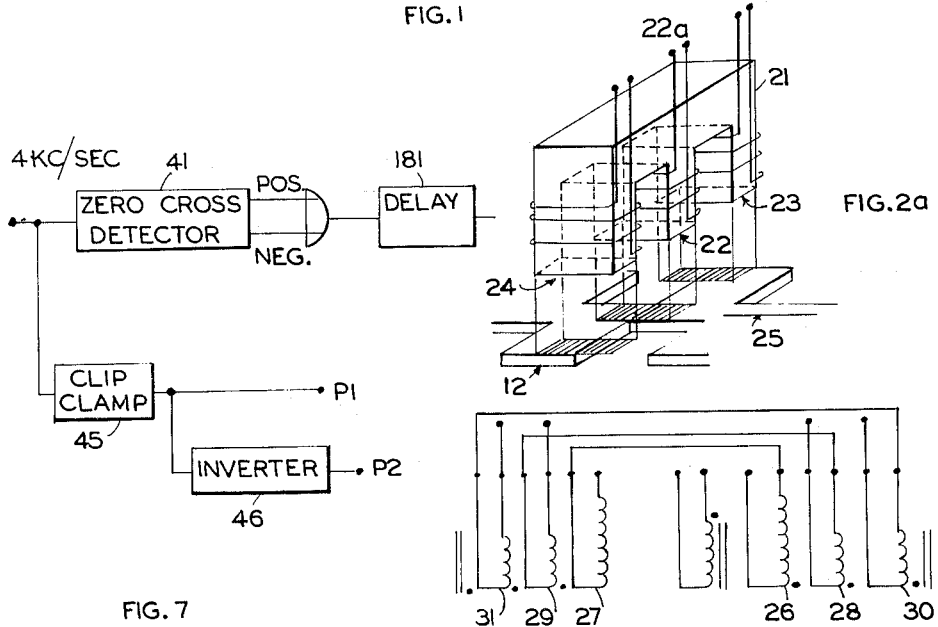
FIG. 7
FIG. 2a
FIG. 2b
INVENTOR.
WOJSLAW MILAN-KAMSKI
BY
Ezekiel Wolf, Wolf and Greenfield
ATTORNEYS March 15, 1966 W. J. MILAN-KAMSKI 3,241,132
SIGNAL TRANSLATION APPARATUS
Filed May 2, 1960 4 Sheets-Sheet 2

INVENTOR.
WOJSLAW MILAN-KAMSKI
BY Ezekiel Wolf, Wolf and Greenfield
ATTORNEYS

INVENTOR.
WOJSLAW MILAN-KAMSKI
BY
Ezekiel Wolf, Wolf and Granfield
ATTORNEYS

INVENTOR.
WOJSLAW MILAN-KAMSKI

United States Patent Office 3,241,132
Patented Mar. 15, 1966

3,241,132
SIGNAL TRANSLATION APPARATUS
Wojslaw J. Milan-Kamski, Auburndale, Mass.
(5 Dalewood Road, West Caldwell, N.J.)
Filed May 2, 1960, Ser. No. 26,221
18 Claims. (Cl. 340—347)

The present invention relates in general to signal translating apparatus and more particularly concerns a novel device for converting a mechanical displacement into a representative electrical signal in digital form. Mechanical displacement with respect to a reference point is indicated virtually instantaneously with great accuracy by presenting an electrical output signal available in parallel digital form. By avoiding mechanical contacts between relatively movable elements, mechanical wear is minimized without sacrificing accuracy. Moreover, the novel system is relatively insensitive to changes in component parameter values.

With the increase in automatization, the requirements for accurate control of the displacements of different members, such as tools or guns, have become more severe. Such members are generally driven by motors controlled by analog representative voltages. In order to determine whether such a member is properly positioned at all times, a signal representative of the member displacement is fed back into a device capable of making computations to determine the required movement to position the member as soon as possible to the desired displacement. Where accuracy is paramount, the necessary computations are performed digitally. Such computations require that the analog quantities representative of mechanical displacement and the derivatives thereof, be converted into digital forms.

In many applications, angular positions and velocities are of interest and shaft position-to-digital converters are employed. Most of these converters in the prior art may be classified into one of three types. A first consists of a rotating disc having tracks of conductive and non-conductive portions positioned in rows in contiguous alternating relationship. A set of fixed brushes contacts the conductive and non-conductive portions of the disc in the different rows whereby leads connected to the brushes provide a plurality of signals representative of the angular displacement of the disc in digital form. An obvious disadvantage of this type of converter is the mechanical wear between brushes and discs and the drag exerted on the disc by the brushes.

A second type is similar in operation to the first but consists of alternating opaque and transparent segments. A suitable source of light illuminates an assembly of photocells through the disc when a photocell is not covered by an opaque section. The output signals from the cells are utilized to represent in digital form the angular displacement of the disc. An obvious disadvantage of this type of arrangement is the need for providing adequate light shielding. Still another disadvantage is the relatively short life due to the aging of the light source. In addition, the physical structure is relatively large.

Still a third type utilizes a large number of small permanent magnets embedded in the rotating disc. The sensing mechanism consists of a plurality of small toroidal cores which individually saturate if they are in close proximity to an embedded magnet. The magnetic condition of the sensing cores is determined by applying voltage pulses to the coils wound thereon. These pulses can readily pass through the low impedance presented by the windings on the saturated cores, but are blocked by the high impedance presented by windings on unsaturated cores. The presence or absence of the pulses form a signal in parallel digital form representative of the disc position. This type of device is limited in accuracy due to the finite dimensions of the toroidal sensing coils. In addition, the discs are relatively expensive to fabricate due to the problem of accurately positioning the numerous small magnets.

It is an important object of the present invention to provide apparatus for accurately determining the relative displacements between a movable member and a prescribed reference point with great accuracy and represent the displacement thus determined, or derivatives thereof, in digital form.

It is still another object of the invention to provide apparatus in accordance with the preceding object in which mechanical wear is minimized without sacrificing accuracy.

Still another object of the invention is to achieve the preceding objects with mechanical means capable of being accurately fabricated in large quantities at relatively low cost.

Still another object of the invention is to provide apparatus in accordance with the preceding objects wherein the accuracy of the output indication is relatively insensitive to the changes in parameter values of the associated system.

According to the invention, at least one readout element is provided having means defining first and second magnetic flux paths. Each path includes a relatively long low reluctance portion in series with a much shorter high reluctance gap. Means are provided having at least first and second magnetic portions. Support means maintain the means with the magnetic portions in a predetermined relationship with respect to the readout elements so as to permit relative movement between the magnetic portions and the gaps whereby the reluctance of the gaps is related to the relative orientation between the magnetic portions and the gaps. The gaps and magnetic portions are relatively movable to a position in which the difference in reluctance between the first and second flux paths assumes a prescribed detectable value.

In a preferred form of the invention, the first and second flux paths are energized with A.-C. energy of the same frequency by means of a winding common to both paths. The output voltage of first and second windings surrounding the first and second paths is then an indication of the difference in reluctance between the two paths. When the reluctance of the two paths is the same and the first and second windings are the same, the voltage across each is essentially the same. By differentially combining the voltages developed across the first and second windings, equal reluctance of the first and second paths is then indicated when such differential combination yields a signal of zero amplitude.

By utilizing a plurality of readout elements and first and second magnetic portions in the manner described in greater detail below, signals are provided which are combined in a novel logical circuit to accurately indicate the displacement of a moving member and the rate of such displacement with great accuracy.

Still another feature of the invention resides in the logical system for interpreting the signals provided by the readout heads. This system is synchronized with the same A.-C. signal applied to the readout heads for establishing the flow of flux so that one multi-bit digital number unambiguously and accurately representative of position is provided for each A.-C. cycle. By utilizing a number of tracks on the disc with several angularly spaced heads scanning at least the track with the most alternating magnetic portions, interpolation techniques are advantageously employed in combining and processing the readout signals to indicate the relative orientation between disc and heads with exceptionally high resolution considerably in excess of the dimensions of each magnetic portion alone.

A specific feature of the invention resides in identifying the quadrant being scanned by sensing the signal readout by first and second readout heads just before the signal from a respective head is quantized with respect to a reference level. During the interval before quantization, the readout signal magnitude exceeds the magnitude of the reference level and the readout signal polarity indicates the sense of the slope of the readout signal being quantized. If the latter polarity is positive and negative, respectively, the signal to be quantized is decreasing and increasing, respectively, and means are provided for programming the logical circuitry so that th eoutput binary number signal is a monotonic function of shaft angle.

Other features, objects and advantages of the invention will become apparent from the following specification when read in connection with the accompanying drawing in which:

FIG. 1 is an exploded view of a disc encoded according to the invention together with a set of readout heads arranged in a representative embodiment of the invention;

FIG. 2A is an enlarged view of a readout head and a portion of the associated magnetic track on the disc;

FIG. 2B is a schematic representation of the electrical connections between windings on a head;

FIG. 4 is a block diagram illustrating the logical arrangement of the control circuit which accepts voltages induced in the readout windings and converts them to a plurality of signals which accurately and unambiguously represent the angular position of the disc in digital from;

FIG. 7 is a block diagram illustrating the logical arrangement of a system for providing pulses which control the phases of the program.

Figure 3:
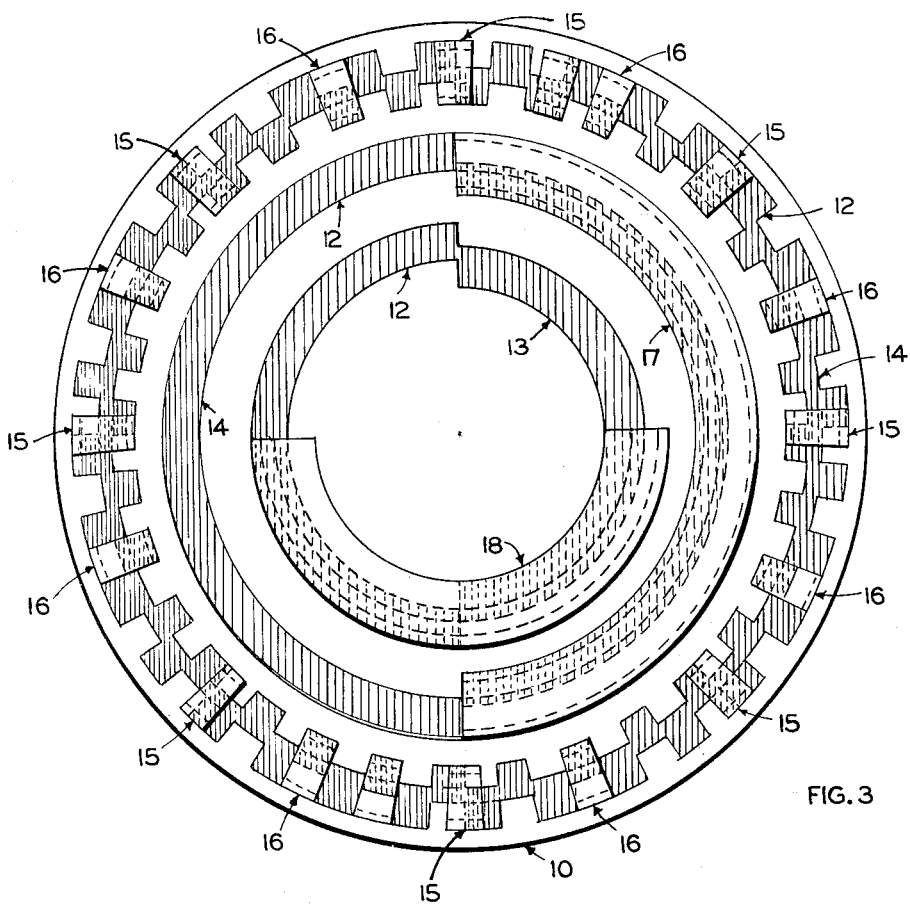
FIG. 3 is a plan view of the encoded disc relative to the readout heads.

With reference now to the drawing and more particularly FIG. 1 thereof, a disc-shaped information member 10 is formed of a nonmagnetic material such as aluminum. The information member 10 is preferably in the form of a disc mounted on the shaft 11 for rotary movement in accordance with the operation of the element whose angular position and angular velocity are to be measured. A plurality of magnetic portions 12 may be provided in the disc 10. The magnetic portions may be provided by first bonding a 0.005″ thick steel sheet to the aluminum disc 10 and then removing unnecessary material by end milling. An alternate method is to build up the pattern by consecutive plating and etching operations. Chemical milling or etching can also be employed in the removal of unnecessary magnetic material which is bonded to the disc 10.

The pattern formed by the magnetic material in FIG. 1 forms three tracks, only three being shown in order to facilitate explaining the principles of the invention. If better resolution is desired, additional tracks may be provided to correspondingly increase accuracy.

The two innermost tracks 13 and 14 are coarse position determinative tracks functioning to identify one of a number of equiangular sectors. The exact position in that sector is determined by scanning the outside or fine track 15a.

In the illustrated embodiment of the invention, the outer or fine track has 32 identical segments. The information derived from the outer track heads 15 and 16 repeats for every $\frac{1}{32}$ of 360 mechanical degrees. The information derived from the two inner track heads 17 and 18 identifies the segment of the outer track. A still higher degree of accuracy may be achieved by adding even finer tracks radially outward from the outer track 15a. For example, a track could be added having $32 \times 32 = 1024$ identical segments.

With such a disc, the angular position within $\frac{1}{1024}$ of 360° may be determined by the inspection of the output derived from scanning such outer most track. Scanning the adjacent radially inward track with 32 identical segments determines that group of 32 outer track segments then being scanned. That is, the number of possible sectors which the signal derived from scanning the outer track could represent is reduced to 32. Finally, scanning the two inner tracks determines the precise outer track segment then being scanned without ambiguity. Logical techniques are employed to insure that the readouts are compatible even if the readouts of the individual tracks do not match exactly. These techniques are discussed in greater detail below.

The signal available from the readout heads is in the form of a modulated A.-C. voltage. Referring to FIG. 2A, there is shown a perspective view of a typical readout head 21. All readout heads essentially form two magnetic flux paths. An excitation coil is wound on the middle leg 22 common to both flux paths of the head 21. Three coils are wound on each outer leg of the head, the outer leg being in a respective one of the flux paths. The voltage induced in the coils wound on the two outer legs 23 and 24 is determined by the flux amplitude through the respective legs which in turn depends upon the amount of magnetic material 12 between the respective outer legs 23 and 24 and the middle leg 22. If the magnetic material 12 is displaced in the direction of the arrow 25, the amount of magnetic material between leg 22 and leg 23 will be reduced and the amount of material between leg 22 and leg 24 will be increased. The reluctance of the gap between the former leg and the middle leg is reduced and that between the latter leg and the middle leg is increased with a corresponding increase and reduction, respectively, in flux amplitude. Consequently, the voltage induced in the coils wound on leg 23 decreases and that induced in coils wound on leg 24 increases by substantially the same amount.

Referring to FIG. 2B, there is shown a schematic representation of the coil connections on a readout head 21. The coils 27 and 26 wound on legs 24 and 23, respectively, are connected back to back. The voltage available across these two coils is an A.-C. voltage proportional to the relative position of the magnetic pattern on the disc and the pick up head. Two additional coils wound on each outer leg of every head are used as reference voltage generators. Coils 28 and 29 are connected serially so that the output voltage is equal to the sum of the voltages induced in the individual coils. The sum of these voltages is essentially constant since the voltage increase in one coil is compensated by an equal decrease in the other coil. Coils 30 and 31 are connected the same way as coils 28 and 29; however, the grounding arrangement is such that the polarity of the output is reversed. The number of turns in coils 28, 30, 31 and 29 is preferably exactly equal to one half of the number of turns in coils 26 and 27. This results in the output voltage across the series combination of coils 28 and 29 and that across the series combination of coils 30 and 31 being equal to one half of the maximum output of coils 26 and 27. The two constant voltages are used as reference levels in determining the angular position of the disc.

All positive reference coils in all the heads 16 are connected serially so that a positive reference voltage is available which is equal to the sum of all of the positive reference voltages. All negative reference coils in all the heads 16 are connected serially so that a negative reference voltage is available which is equal to the sum of all the negative reference voltages. All the information coils which are connected back to back within each head are also connected serially so that a voltage is available which is equal to the sum of the differences of all the voltages induced in the information coils. The windings of all heads 15 as well as the windings of heads 17 and 18 are connected in the same way as the coils of heads 16.

The inner track heads are basically the same as the head shown in FIG. 2A; however, they extend arcuately over a full 180°. There are two such semicircular heads relatively displaced by 90°.

The outer track heads form two groups of eight heads each, the heads in one group being designated by the reference numeral 15 and those in the other by the reference numeral 16. The two groups are relatively displaced so that when the output of one set of eight heads is zero, the output of the outer set is maximum and vice versa. If a sector corresponding to 1/32 of 360° is regarded as a full cycle of the output of the outer track heads, the output signals from the two sets of outer track heads may be regarded as being displaced by 90°.

All output coils of the outer track heads 15 are connected in series so that the combined output is equal to the sum of the outputs of the individual readout heads. All output coils of the outer track heads 16 are similarly connected to provide the sum of the outputs of the individual output heads but displaced by 90° from the heads 15 signals.

Figure 5:
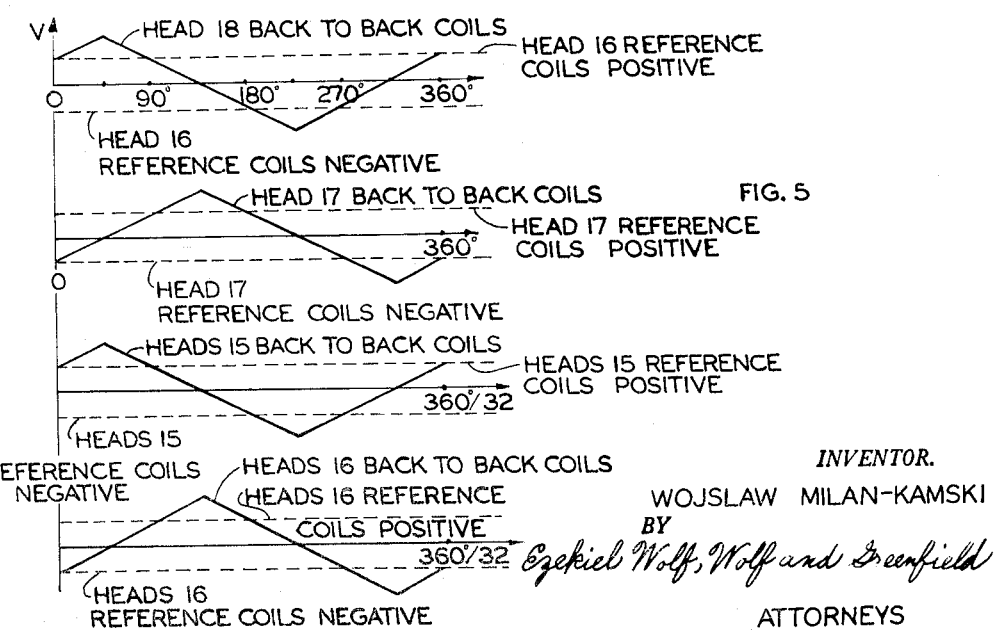
FIG. 5 is a graphical representation of signal amplitudes across the different coils as a function of angular position of the disc.

Referring to FIG. 5, there is illustrated a graphical representation of the positive reference voltages, the negative reference voltages and the information voltages derived from the different heads. The broken lines represent the constant reference voltage while the solid lines represent the voltages derived from the identified back to back coils. Each voltage is fully identified in the drawing and reference to this drawing will be helpful in the subsequent discussion concerning the interpretation of the readout voltages.

Figure 4:
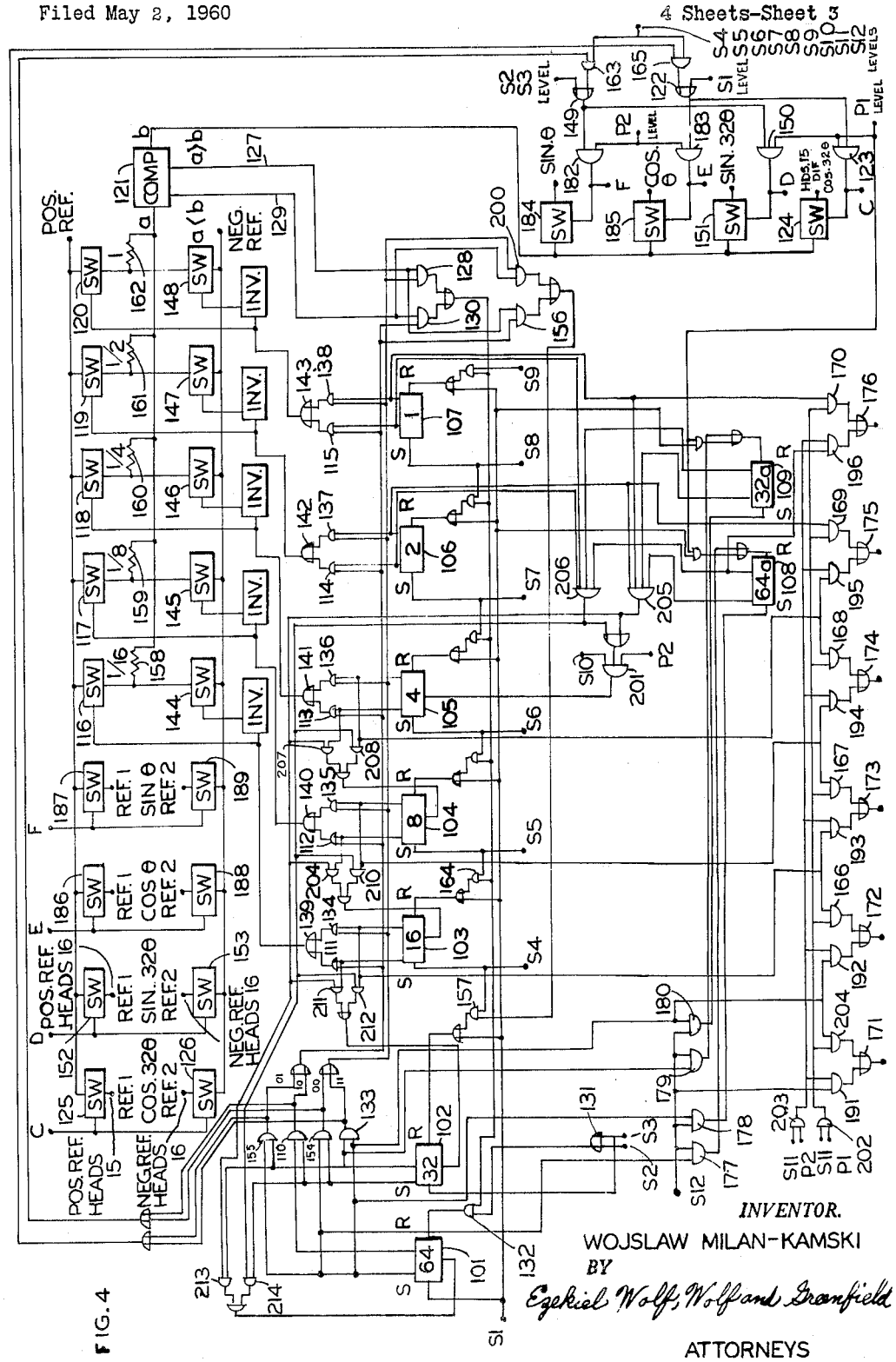

Referring to FIG. 4, there is shown a block diagram illustrating the logical arrangement of a decoder for interpreting the readout signals to provide an electrical digital representation of the disc angular position.

The decoder comprises a plurality of logical elements such as OR and AND gates, storage elements, low impedance switches and a comparator. Standard logical symbols are employed to identify the gates; that is, an arc subtended by a chord. For an AND gate, the input lines terminate upon the chord, while for an OR gate, the input lines intersect the chord and terminate upon the arc. The set and reset inputs of flip-flop storage elements are identified by the letters S and R, respectively. A switching element is identified by the letters SW within the appropriate block. A logical inverter is identified by the letters INV within the appropriate block.

Figure 6:
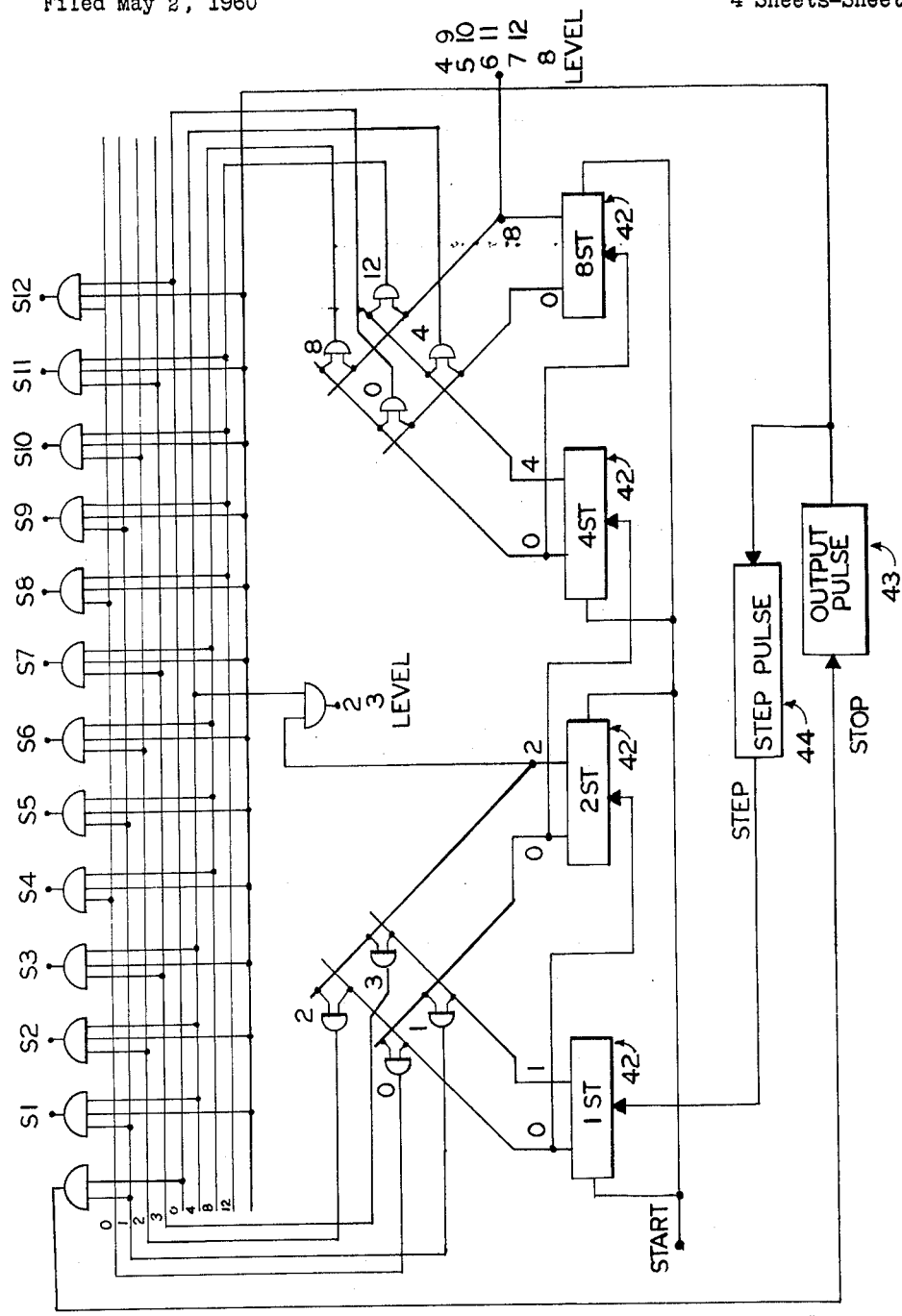
FIG. 6 is a block diagram illustrating the logical arrangement of a system for providing sequencing pulses for controlling the steps in each phase of the program for converting angle voltages into digital form.

The decoder utilizes externally provided programming signals derived from the systems shown in FIGS. 6 and 7 in addition to the reference and information signals derived from the different readout heads. These programming signals are in the nature of voltage levels identified as S1–S12, the appended numeral referring to the sequence of the associated step then being followed in the program phase. The program has two phases controlled by the signals identified as P1 and P2 for the first and second phases, respectively.

Referring now to FIGS. 6 and 7, the programmer or sequencer for controlling the decoder of FIG. 4 will be briefly discussed. The timing of both the sequencer and the decoder is controlled by the same A.-C. signals which are used for the excitation of the readout heads. In the drawings, the A.-C. source is represented as being applied to the zero crossing detector 41 shown in FIG. 7. It is to be understood that this same signal is applied to the input terminals of the coil wound on the middle leg 22 of each readout head 21. The zero crossover detector 41 generates pulses whenever the excitation voltage passes through zero. The zero crossover pulses are delayed by the delay section 181 for a sufficient time to allow the excitation voltage applied to the heads to reach a reasonably high level, such as 0.7 of the peak value. The delayed pulses reset a binary counter having four stages 42 shown in FIG. 6. The resetting of this counter removes the inhibiting STOP signal from the input to output pulse generator 43.

The output pulse generator 43 then provides an output pulse which appears at the output of gate number 1. The same output pulse triggers the step pulse generator 44 which advances the four stage binary counter.

The operation of the sequencer continues until the STOP signal appears at the input to the output pulse generator 43. While the sequencer operates, suitable pulses and levels appear at the appropriately identified terminals shown in FIG. 6 and applied to correspondingly identified terminals in FIG. 4.

The particular phase of the program is under the control of the P1 and P2 phase control signals. The clip clamp circuit 45 is energized by the A.-C. signal which energizes the different heads. During one half cycle, it provides the P1 signal on the appropriately identified terminal. During the other half cycle, the inverter 46 inverts the polarity on the P1 terminal to provide a P2 level on the appropriately identified terminal. Since both phases of the program are completed once per A.-C. cycle, a twelve-bit binary number is provided once per cycle of the A.-C. input signal.

Referring again to FIG. 4, decoder operation may be understood from an inspection thereof together with the following explanation. During a positive-going half cycle of the A.-C. excitation signal, P1 level is present and an S1 signal resets storage elements 102–109 and sets storage element 101. The resetting of storage elements 102 and setting at storage element 101 enables gate 110. Gate 110 in turn enables gates 111–115, which operate switches 116–120, respectively.

One input of the comparator 121 is then connected to the positive reference signal bus-bar carrying positive reference signal from the appropriately selected heads. At the same time, an S1 level is applied to gate 122. The combination of P1 level and S1 level enables gate 123 to activate switches 124–126. Switch 124 connects the differential or information output of heads 15 and input $b$ to the comparator 121. Switch 125 connects the positive reference bus-bar to the positive reference voltage derived from heads 15. Switch 126 connects the negative reference bus-bar to the negative reference voltage derived from the heads 15.

If the positive reference voltage thus connected is greater than the information voltage, a pulse appears at the output of the comparator 121 on line 127. This output, however, will be blocked by gate 128. If the positive reference voltage is lower than the information voltage, a pulse appears at the output of the comparator on line 129. This pulse is admitted by gate 130.

During the next step in this phase of the program, an S2 pulse appears at the input to gate 131 and is admitted to gate 132. If gate 132 was enabled by the output of the comparator, the signal resets storage element 101. If the output of the back to back coils is lower than the positive reference voltage, storage element 101 remains set.

First consider the condition in which storage element 101 remains set. During steps 2 and 3, S2 and S3 levels are applied to gate 149. Since P1 level is present, gate 150 is activated and switches 151, 152 and 153 are closed.

A positive reference voltage is applied to input $a$ of the comparator and the output of the back to back coils of heads 16 is applied to input $b$ of the comparator. Since gate 110 is activated, gate 130 is enabled and if the output of the back to back coils is higher than the positive reference voltage, a signal will appear at the output of gate 130. If the positive reference voltage is higher than the voltage of the back to back coils, no signal is applied to gate 132.

Assume that the output of the back to back coil is higher than the positive reference voltage. An S2 pulse is then passed by gate 132 and storage element 101 is reset. This indicates that storage element 101 is in its reset condition corresponding to binary zero. This condition is in accordance with the binary notation for the angular sector 0–180°.

Storage element 101 is reset and storage element 102 is also in the reset condition. Consequently, gate 154 is activated to enable gates 134–138 and gate 128. Since no signals are present at the outputs of gates 139–143, switches 144–148 are closed and input $a$ of the comparator 121 is connected to the negative reference bar.

A comparison is made between the negative reference voltage and the output of heads 16. The outcome is unimportant since storage element 101 has already been reset.

During the third step of this phase of the program, an S3 pulse sets storage element 102. With storage element 101 reset and storage element 102 set, corresponding to binary notation 01, gate 155 is activated, causing a connection to be made between the positive reference voltage bus and input $a$ to the comparator 121. During this third step, a comparison is made between the positive reference voltage and the differential output of heads 16. If the output of the heads is lower than the positive reference voltage, an output appears on line 127 and is passed by gate 156 which was enabled by gate 155. This signal enables gate 157.

An S4 pulse resets storage element 102 to narrow down the angular sector to 0–90°, which sector is represented by binary code 00. The S4 pulse also sets storage element 103.

A binary 00 condition of storage elements 101 and 102 activates gates 154. Storage element 103 has been set and storage elements 104–107 are reset, thereby activating switches 116 and 145–148. Switch 116 connects resistor 158 to the positive reference voltage and switches 145–148 connect resistors 159–162, respectively, to the negative reference voltage, the ratio of the resistor values being respectively 1/16:1/8:1/4:1/2:1.

Resistor 158 is connected to the positive reference voltage and all the remaining resistors are connected to the negative reference voltage. The value of the parallel combination of resistors 159–162 is equal to 1/15 normalized with respect to the value of resistor 162. The voltage which is applied to input $a$ of the comparator 121 is then slightly lower than half the voltage between the positive and negative reference voltages.

A voltage for application to input $b$ is derived in the following manner. Gate 154 activates gate 163 which is enabled by the S4–S12 level. The output signal from this gate is admitted by gate 149 to activate gate 150 which has been enabled by the P1 level. Gate 150 activates switches 151–153. A comparison is made between the reference derived from head 16 altered by the selectively switched resistors, and the back-to-back voltage derived from heads 16. If the voltage derived from the back-to-back connection coils on input $b$ is lower than the voltage applied to input $a$ of the comparator 121, an output of the comparator is passed by gate 128 to enable gate 164.

An S5 pulse is admitted by gate 164 to reset storage element 103 and further limit the selection of the angular sector to 0–45 degrees, corresponding to binary 000. The S5 pulse also sets storage element 104.

The comparison cycle which determines the condition of storage element 104 is exactly the same as the subsequent cycles which control the state of storage elements 105–107. When the comparisons are completed, a seven digit binary number is stored in storage elements 101–107 characteristic of the position of the rotating member within 1/32 of 360° with an accuracy of one part in 128, the error being not greater than plus or minus one part in 256.

If during the third step, the differential output of head 16 is greater than the positive reference voltage, an output appears at the comparator on line 129. This output, however, is blocked by gate 200 and pulse S4 cannot reset storage element 102. The binary code then becomes 01 which identifies the interval of 90–180°.

In the presence of the binary code 01, gate 155 is activated. Since storage element 103 was set by step pulse S4, resistor 158 is connected to the negative reference voltage, and resistors 159–169, to the positive reference voltage. Input $a$ to the comparator 121 is then at a potential which is slightly higher than half way between the negative reference voltage and the positive reference voltage. Since gate 155 is activated, gate 165 is also activated and since level P1 is present, gate 123 is open which operates switches 124–126 to select the outputs of heads 16.

If the differential output is higher than the level at input $a$ to the comparator, a signal appears at the output of gate 130, and when an S5 pulse appears, storage element 103 is reset. The binary code then becomes 010, indicative of the angular interval 90–135°. The subsequent comparisons follow the same pattern until all seven binary digits are determined. If during the first step, input $b$ to the comparator is lower than input $a$, no enabling signal appears at gate 132 and an S2 pulse cannot reset storage element 101. Storage element 101 remains then in the binary 1 condition to identify the interval of 180–360°.

If during the third step, input $b$ to the comparator is higher than input $a$, gate 200 is activated and gate 157 is enabled. An S4 pulse resets storage element 102 to establish the binary code of 10, identifying the angular interval 180–270°.

An S4 pulse then sets storage element 103. Resistor 158 is then connected to the negative reference voltage and resistors 159–162, to the positive reference voltage. Input $a$ to comparator 121 is then slightly more than half the voltage between the positive and negative reference voltages. If input $b$ is higher than input $a$, a signal enables gate 164 and an S5 pulse resets storage element 103. Subsequent comparisons establish the condition of storage elements 104–107.

Assume now that during the third step, comparator input $b$ is lower than comparator input $a$, then gate 157 is not enabled and an S4 pulse does not reset storage element 102. The code thus established is binary 11 which corresponds to the interval 270–360°. Since an S4 pulse sets storage element 103, resistor 157 is connected to the positive reference voltage and resistors 158–161, to the negative reference voltage. The voltage which is applied to input $a$ of the comparator 121 is then slightly lower than half the voltage between the negative and the positive reference voltages. If input $b$ is at a voltage which is lower than input $a$, an enabling signal is applied to gate 164 and an S5 pulse is passed to reset storage element 103. Subsequent comparisons establish the conditions of storage elements 104–107.

The first nine steps in the first phase determine a seven binary digit number which identifies the position of the rotating member within any of the thirty-two angular sectors. An additional five binary digits of greater significance are needed to determine fully the position of the rotating member without any ambiguity. During the tenth step in the first phase, an S10 pulse is at the input to gate 201; however, the P2 signal level is absent and the pulse is blocked. The function of this pulse will be explained later.

During the eleventh step, an S11 pulse appears at the input to gates 202 and 203. The presence of the P1 level activates the gate 202. Gate 202 applies a read pulse to gates 204 and 166–170. A pattern of parallelly available pulses will appear at the outputs of gates 171–176. The pattern corresponds to the binary number stored in storage elements 102–107 The pattern of pulses available at the output of the system constitutes the six least significant binary digits of a twelve digit binary number representative of the disc angular orientation.

During the twelfth step, an S12 pulse activates gates 177–180. The output of these gates is applied directly to storage elements 108 and 109 to enable the information stored therein to be used during phase 2. This stored information represents the two most significant digits determined during phase 1.

After the twelfth step, the sequencer is arrested by the STOP signal. The sequencer is restarted by the output of the delay network 181 (FIG. 7). The excitation signal reverses polarity and a negative zero crossing is detected. The P2 level is now present and the P1 level terminates. The presence of the P2 level establishes phase 2. The sequencer repeats the steps of phase 1.

In the decoder program, steps S1–S9 are identical to those followed in the first phase; however, readouts from heads 17 and 18 are used instead of heads 15 and 16. The windings of heads 17 and 18 are connected so that the polarity of the signals during phase 2 is the same as the polarity of signals available from heads 15 and 16, respectively, during phase 1.

It can be seen that the only difference between phase 1 and phase 2 is that the following substitutions are made: gate 182 for gate 150, switch 184 for switch 151, switch 185 for switch 124, switch 186 for switch 125, switch 187 for switch 152, switch 188 for switch 126, and switch 189 for switch 153.

During phase 2, a seven digit binary number is stored in storage elements 101–107. Operation of the system for the first nine steps of phase 2 is identical to that for phase 1 described above. During step 9, however, gate 205 is activated if storage elements 106 and 107 are set and storage elements 106 and 107 are reset and storage elements 108 and 109 are set.

If gate 205 is activated, binary 1 must be subtracted from the number which is stored in storage elements 101–105. If gate 206 is activated, binary 1 must be added to the number which is stored in storage elements 101–105.

The subtraction and addition of a one is accomplished by connecting storage elements 101–105 as a reversible binary counter. The subtraction or addition of a one is accomplished by complementing the content of storage element 105. Appropriate carries are propagated depending on the condition of gates 205 and 206. For any other combination, gates 205 and 206 are not activated.

The reason for the addition or subtraction of a one is as follows. In the specific embodiment described herein, the outer or fine track consists of 32 identical angular sectors. The readout of the outer track is presented in the form of seven binary digits. The inner tracks consist of a single cycle for the full circular sector and the readout of the inner tracks is represented by seven binary digits. However, only five binary digits are needed to identify any one of the thirty-two sectors of the outer track. As a result, the two most significant digits derived from scanning the outer track and the two least significant digits derived from scanning the inner tracks overlap. If all tracks were perfectly accurate, the two overlapping digits derived from scanning both inner and outer tracks would always be the same. However, even the slightest discrepancy may result in a disagreement between overlapping digits.

Since the outer track readout signal affords higher resolution than that from the inner tracks, the two most significant digits of the outer track are used for readout rather than the two least significant digits of the inner tracks. However, the inner tracks are accurate enough so that the discrepancy between the outer and the inner tracks is never greater than one least significant digit of the inner tracks.

It is always possible then to correct the readout of the coarse or inner tracks either by the addition or subtraction of the one. Since the two most significant digits of the outer track are substituted for the two least significant digits of the inner tracks, the addition or subtraction of a one which does not involve a carry or a borrow beyond the two least significant digits is unnecessary. The condition in which a carry or a borrow beyond the two least significant digits is necessary is sensed by gates 205 and 206. This condition is either 0011 or 1100. In the first case, the subtraction of a one is necessary and in the second, the addition of a one.

Assume that the content of storage elements 106 and 107 are both ones and that the content of storage elements 108 and 109 are both zeroes. Gate 205 is activated to enable gates 201. The P2 level is also present. When an S10 pulse appears and gate 201 is activated, a complementing signal appears at the input to storage element 105. Storage element 105 reverses its state and a negative-going pulse appears at the inputs to gates 207 or 208, depending upon the original condition of storage element 105.

The output of gates 205 enables gates 207, 209, 211 and 213. If storage element 105 was in its set condition, a negative-going pulse appears at the input to gate 207 and a complementing signal is applied to storage element 104. If storage element 105 was in a reset condition, a positive-going pulse appears at the input to gate 208 and is blocked. Storage element 104 remains unchanged. The same sequence repeats for storage elements 103, 102 and 101.

If storage elements 106 and 107 are both reset and storage elements 108 and 109 are both set, gate 206 is activated and gates 208, 210, 212 and 214 are enabled. If storage element 105 was in a set condition, the complementing signal resets the storage element and a positive-going pulse appears at the input to gates 208 and is blocked. Storage element 104 is not contemplated. If, however, storage element 105 was in a reset condition, a negative-going pulse appears at the input to gate 208 and storage element 104 is reset. The same sequence is repeated for storage elements 103, 102 and 101.

When an S11 pulse is generated, gate 203 is enabled by the P2 level and pulse S11 appears at the input to gates 191–196. The output of gates 171–176 is then determined by the condition of storage elements 101–105 and 108, respectively. These pulses constitute the second group of six binary digits of a twelve binary digit output of the system. Pulse S12 causes the transfer of the content of storage elements 101 and 102 to storage elements 108 and 109, respectively. However, all storage elements will be reset by the S1 pulse during the subsequent P1 phase. Thus, during the first phase of each cycle, the six least significant digits of the binary number representation of the disc angular position is provided in parallel and may be directed to six storage elements in an external register. During the second phase, the six most significant digits of the binary number are provided in parallel and may be stored in six other elements of the external storage register. Since the external system receives a twelve-digit binary number for each A.-C. cycle, instantaneous positional data is always available for digital computation and instantaneous velocity and acceleration readily determinable by operating upon the successive binary numbers.

The system described herin represents only an exemplary embodiment of the invention. A decoding system employing the inventive concepts may have many more binary digits. More tracks could be added to the disc. Additionally, the system is not limited to rotating members. A linear scale may be employed to represent a linear displacement. In general a scale consisting of magnetic segments together with a suitable readout assembly may be formed in numerous ways in accordance with the principles of the invention. It is preferred, however, that the air gap between the disc and readout heads be maintained approximately constant.

The invention has a number of advantages. Since readout is derived simultaneously from a plurality of readout heads circumferentially displaced, it is possible to completely compensate for the eccentricity between the encoded pattern and the center of rotation of the rotating members. Additionally, all other errors are averaged out. For example, error due to the imperfect closing of the pattern machined in the magnetic material is reduced exactly by a factor which is equal to the number of heads. In the embodiment described, this factor is equal to eight.

The electromagnetic readout makes it possible to eliminate any mechanical contact between the rotating or moving member and the readout devices. In addition, the electromagnetic readout system is extremely reliable, requires only a low voltage excitation of the order of several volts as compared to the several hundred volts required in prior art optical shaft encoders.

Extremely rapid readout rates are possible. For example, in the embodiment described, 4,000 complete 12 binary digit readouts per second are available. This speed can be greatly increased if desired since it is only limited by the operating speed of the electronic decoder and can be readily increased within the present state of the electronic art by a factor of 10.

The novel shaft encoder can be manufactured employing conventional high precision machines on a mass production basis. Optical shaft encoders of comparable accuracy must be individually aligned in order to minimize the eccentricity between the code pattern and the center of rotation.

The accuracy of the system is determined by the accuracy of the outer track only. The inner tracks need only be sufficiently accurate to determine without error the segment of the outer track. Since this track is the longest, the percentage accuracy of the indication is maximized for a prescribed practically realizable mechanical tolerance.

Position determination is accomplished by the measurement of voltage ratios rather than by the measurement of absolute values of the amplitudes. This mode of operation renders the system insensitive to variations of the excitation voltage. Slight variations in the air gap reluctance are also compensated for since the reference voltages are derived from the same readout heads and are equally affected by the variations of the air gap.

It is evident that those skilled in the art may now make numerous modifications of and departures from the specific embodiments described herein without departing from the inventive concepts. Consequently, the invention is to be construed as limited only by the spirit and scope of the appended claims.

What is claimed is:

1. Apparatus for converting an analog quantity into an electrical signal in digital form comprising,
   a readout element having means defining first and second magnetic flux paths, each of said magnetic flux paths including a relatively long low reluctance portion in series with a much shorter high reluctance gap,
   means having at least first and second magnetic portions for altering the reluctance of said first and second magnetic flux paths respectively,
   support means for maintaining the latter means and said readout element in a predetermined relationship permitting relative movement between said magnetic portions and said gaps through a sequence of positions in which first the reluctance of said first magnetic flux path reaches a minimum contemporaneously with the reluctance of said second magnetic flux path reaching a maximum, second the reluctance of said first and second magnetic flux paths reach substantially equal values and third the reluctance of said first magnetic flux path reaches a maximum contemporaneously with said second magnetic flux path reaching a minimum,
   the reluctance of said gaps being related to the relative orientation between said magnetic portions and said gaps,
   said gaps and said magnetic portions being relatively movable to a position in which the difference in reluctance between said first and second flux paths assumes a prescribed detectable value,
   means for directing magnetic flux through said first and second magnetic flux paths,
   means for sensing the difference in flux values through said first and second flux paths to provide an output signal that is linearly related to the relative displacement between said magnetic portions and said gaps over a continuous range of such relative displacement embracing the position corresponding to said equal reluctance,
   and analog-to-digital conversion means for converting said output signal into digital form.

2. Apparatus in accordance with claim 1 and further comprising, an additional plurality of said readout elements in fixed relationship with respect to said first mentioned element whereby said detectable value occurs for each of said elements at different relative orientations between said magnetic portions and the plurality of readout elements.

3. Apparatus in accordance with claim 2 and further comprising, means for directing magnetic flux through said first and second magnetic flux paths of each readout element, and means for sensing the difference in flux values through said first and second paths of each element.

4. Apparatus in accordance with claim 1 wherein said gaps are aligned along a line of direction transverse to the direction of relative movement between said readout element and said magnetic portions with one of said portions positionable opposite one of said gaps and the other of said portions positionable opposite the other of said gaps.

5. Apparatus in accordance with claim 4 wherein said portions are relatively displaced along said direction of relative movement.

6. Apparatus in accordance with claim 5 and further comprising, an additional plurality of said first and second portions, each first portion being contiguous with adjacent second portions but displaced therefrom along and orthogonal to said direction of relative movement, each first and second portion being tangential to a line parallel to the path of said relative movement on opposite sides of said line.

7. Apparatus in accordance with claim 6 wherein said path is a circle.

8. Apparatus in accordance with claim 6 and further comprising, at least another of said readout elements with its airgaps defining flux leakage channels transverse to said direction of relative movement transversely displaced from said first-mentioned path on opposite sides of a second path of said relative movement parallel to the first-mentioned path, a second plurality of said first and second portions, the latter first and second portions contiguously arranged tangential to and on opposite sides of a second line parallel to said second path, said second plurality being different from the number of portions tangential to said first-mentioned line.

9. Apparatus in accordance with claim 8 wherein said lines are concentric circles.

10. Apparatus in accordance with claim 8 and further comprising means for energizing said readout elements with A.-C. energy of the same frequency to establish flux through said first and said second paths of the same frequency, means for deriving a flux differential signal from each readout element representative of the difference in reluctance between the first and second flux paths, and means for combining said flux differential signals to derive an output signal in digital form representative of the contemporaneous relative orientation between said readout elements and said means being said first and second magnetic portions.

11. Apparatus in accordance with claim 10 and further comprising at least a third of said readout elements with its airgaps defining radial flux leakage channels, said third readout element airgaps being radially displaced from said first and second paths on opposite sides of a third circular path concentric with said first and second paths, means for combining the signals from said another and said third readout elements produced in response to relative movement along said second and third paths to provide a coarse sector identifying signal indicative of a predetermined range of relative positions along said first path within a uniquely identified sector, and means for combining the signals from said first-mentioned readout elements to provide a signal indicative of a relative position along said first path within said uniquely identified sector.

12. Apparatus in accordance with claim 11 wherein said another and said third readout elements comprise a pair of semicircular readout heads in space quadrature which provide a pair of signals in phase quadrature, and said means combining the latter signals comprises, means responsive to the polarity of the latter signals for providing an unambiguous indication of the quadrant fully defining said uniquely identified sector.

13. Apparatus in accordance with claim 12 and further comprising, means for providing two binary bit signals to identify said quadrant.

14. Apparatus in accoradnce with claim 13 and further comprising, analog-to-digital conversion means responsive to said coarse sector identifying signal and said first-mentioned elements readout signal for providing additional binary bit signals representative of said relative position.

15. Apparatus in accordance with claim 14 wherein a group of most significant bits derived from said first-mentioned elements readout signal corresponds in significance to a group of least significant bits derived from said coarse sector identifying signal, and further comprising, means for first deriving and storing said coarse sector identifying binary bit signals, means for then deriving said first-mentioned elements readout signal binary bit signals, means for comparing said group of least significant bits with said group of most signficant bits, and means for altering the former group to correspond to the latter group when any bits in the two groups differ.

16. Apparatus for converting an analog quantity into an electrical signal in digital form comprising, means having at least first and second portions of a first type which contrast with contiguous background portions of a second type, a readout element capable of distinguishing between said first and second types of provide a characteristic signal, support means for maintaining the former means and said readout element in a predetermined relationship permitting relative movement between said readout element and said first-mentioned means along a predetermined path parallel to a line on said first-mentioned means, said first and second portions being alternately disposed on opposite sides of said line, said readout element including means for scanning an area divided by said line to provide an output signal both proportional to the ratio of first type area to second type area then within said scanned area and representative of which of the latter first and second type areas within said scanned area is the larger, and analog-to-digital conversion means responsive to said output signal for providing said electrical signal in digital form.

17. Apparatus in accordance with claim 16 and further comprising an additional plurality of said first and second portions alternately disposed upon opposite sides of a second line parallel to said first line, the number of said first and second portions along said second line being different from the number thereof along said first line, a second readout element for scanning said second plurality of first and second portions along a path defined by said second line to provide a second output signal, and means for combining said output signals to provide said electrical signal in digital form.

18. Apparatus in accordance with claim 17 wherein said lines are concentric circles.

References Cited by the Examiner

UNITED STATES PATENTS

| | | | |
|---|---|---|---|
| 1,537,692 | 5/1925 | Prouty | 310—237 |
| 2,456,993 | 12/1948 | Rombo et al. | 310—237 |
| 2,794,851 | 6/1957 | Morriss | 340—347 |
| 2,909,717 | 10/1959 | Hulls et al. | 340—347 |
| 2,958,859 | 11/1960 | Lentz et al. | 340—347 |
| 2,958,860 | 11/1960 | Petherick | 340—347 |
| 2,976,528 | 3/1961 | Greunke et al. | 340—347 |
| 3,038,345 | 6/1962 | Hoeppner et al. | 340—347 |

MALCOLM A. MORRISON, *Primary Examiner.*

IRVING L. SRAGOW, *Examiner.*